US012692377B2

(12) United States Patent
van der Meer et al.

(10) Patent No.: US 12,692,377 B2
(45) Date of Patent: Jul. 28, 2026

(54) EXPANDED BEADS COMPRISING HIGH MELT STRENGTH POLYPROPYLENE

(71) Applicant: SABIC GLOBAL TECHNOLOGIES B.V., Bergen op Zoom (NL)

(72) Inventors: Douwe Wiebe van der Meer, Maastricht (NL); Mark Leo Hendrik Theunissen, Brunssum (NL); Martin Antonius van Es, Epen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 536 days.

(21) Appl. No.: 18/275,114

(22) PCT Filed: Feb. 18, 2022

(86) PCT No.: PCT/EP2022/054068
§ 371 (c)(1),
(2) Date: Jul. 31, 2023

(87) PCT Pub. No.: WO2022/175447
PCT Pub. Date: Aug. 25, 2022

(65) Prior Publication Data
US 2024/0026106 A1 Jan. 25, 2024

(30) Foreign Application Priority Data

| | | | |
|---|---|---|---|
| Feb. 18, 2021 | (EP) | ................................... | 21157928 |
| Feb. 18, 2021 | (EP) | ................................... | 21157932 |
| Feb. 18, 2021 | (EP) | ................................... | 21157935 |
| Feb. 18, 2021 | (EP) | ................................... | 21157966 |
| Feb. 18, 2021 | (EP) | ................................... | 21157969 |

(51) Int. Cl.

| | |
|---|---|
| *C08L 23/12* | (2006.01) |
| *C08F 10/06* | (2006.01) |
| *C08F 110/06* | (2006.01) |
| *C08J 5/18* | (2006.01) |
| *C08J 7/12* | (2006.01) |
| *C08J 9/00* | (2006.01) |
| *C08J 9/14* | (2006.01) |
| *C08J 9/18* | (2006.01) |
| *C08K 3/34* | (2006.01) |
| *C08L 23/06* | (2006.01) |
| *C08L 23/14* | (2006.01) |

(52) U.S. Cl.
CPC .............. *C08L 23/12* (2013.01); *C08F 10/06* (2013.01); *C08F 110/06* (2013.01); *C08J 5/18* (2013.01); *C08J 7/123* (2013.01); *C08J 9/0061* (2013.01); *C08J 9/0066* (2013.01); *C08J 9/141* (2013.01); *C08J 9/18* (2013.01); *C08K 3/34* (2013.01); *C08L 23/06* (2013.01); *C08L 23/142* (2013.01); *C08J 2201/03* (2013.01); *C08J 2203/14* (2013.01); *C08J 2323/12* (2013.01); *C08J 2323/14* (2013.01); *C08J 2323/18* (2013.01); *C08J 2423/12* (2013.01); *C08L 2203/14* (2013.01); *C08L 2203/30* (2013.01); *C08L 2205/025* (2013.01); *C08L 2205/03* (2013.01); *C08L 2205/035* (2013.01)

(58) Field of Classification Search
CPC ............... C08J 2203/14; C08J 2323/12; C08J 2323/14; C08J 2323/18; C08J 2423/12; C08J 9/232; C08J 2323/10; C08J 2323/16; C08J 2423/06; C08J 9/16; C08L 2203/14; C08L 2203/30; C08L 2205/03; C08L 2205/035; C08L 2201/08; C08L 23/12; C08L 23/0823
See application file for complete search history.

(56) References Cited

U.S. PATENT DOCUMENTS

| | | | |
|---|---|---|---|
| 5,929,129 | A | 7/1999 | Feichtinger |
| 6,315,931 | B1 | 11/2001 | Bruning et al. |
| 6,506,842 | B1 | 1/2003 | Heck et al. |
| 6,664,317 | B2 | 12/2003 | King, III |

(Continued)

FOREIGN PATENT DOCUMENTS

| | | | |
|---|---|---|---|
| CN | 101104716 A | * | 1/2008 |
| DE | 102011052273 A1 | | 1/2013 |

(Continued)

OTHER PUBLICATIONS

International Search Report for International Application No. PCT/EP2022/054068, International Filing Date Feb. 18, 2022, Date of Mailing May 13, 2022, 4 pages.

(Continued)

*Primary Examiner* — K. Boyle

(74) *Attorney, Agent, or Firm* — CANTOR COLBURN LLP

(57) ABSTRACT

A polymer composition includes a) ≥10 wt % and ≤60 wt % of a high melt strength polypropylene, b) ≥10 wt % and ≤35 wt % of a polyethylene, c) ≥10 wt % and ≤60 wt % of a first polypropylene, wherein the first polypropylene is chosen from the group of propylene homopolymers, propylene copolymers and/or mixtures thereof, and d) ≥0 wt % and ≤60 wt % of a second polypropylene, wherein the sum of the high melt strength polypropylene, the first polypropylene and the second polypropylene is ≥60 wt % based on the sum of the weight of the high melt strength polypropylene, the polyethylene, the first polypropylene and the second polypropylene. The polyethylene has a density ≥940 kg/m³ and ≤970 kg/m³ as determined according to ISO 845 (2006).

15 Claims, No Drawings

(56) References Cited

U.S. PATENT DOCUMENTS

| 6,872,764 | B2 | 3/2005 | King, III |
| 2004/0258902 | A1 | 12/2004 | Seth et al. |
| 2008/0058437 | A1 | 3/2008 | Burgun et al. |
| 2018/0051160 | A1 | 2/2018 | Pehlert et al. |
| 2018/0201752 | A1 | 7/2018 | Lin |
| 2019/0194436 | A1 | 6/2019 | Carr et al. |
| 2019/0276653 | A1 | 9/2019 | Mcloughlin et al. |
| 2020/0087478 | A1 | 3/2020 | Braun et al. |
| 2022/0010084 | A1 | 1/2022 | Kwon et al. |
| 2024/0132642 | A1 | 4/2024 | Degenhart et al. |
| 2024/0309163 | A1 | 9/2024 | Degenhart et al. |
| 2024/0317984 | A1 | 9/2024 | Krist et al. |

FOREIGN PATENT DOCUMENTS

| EP | 1892264 | A1 | 2/2008 | |
| EP | 2151470 | A1 | 2/2010 | |
| EP | 2679630 | A1 | 1/2014 | |
| EP | 3889210 | B1 | 7/2023 | |
| KR | 20180099562 | A * | 9/2018 | ............. C08L 23/06 |
| WO | 0194092 | A1 | 12/2001 | |
| WO | 2009003930 | A1 | 1/2009 | |
| WO | 2016005301 | A1 | 1/2016 | |
| WO | 2022175445 | A1 | 8/2022 | |
| WO | 2022175450 | A1 | 8/2022 | |
| WO | 2022175452 | A1 | 8/2022 | |

OTHER PUBLICATIONS

Peacock Andrew J., "Handbook of Polyethylene, Chapter 3 Production Processes", 2000, Marcel Dekker, Inc., New York; ISBN 0824795466; p. 43-66.
Written Opinion for International Application No. PCT/EP2022/054068, International Filing Date Feb. 18, 2022, Date of Mailing May 13, 2022, 5 pages.

* cited by examiner

EXPANDED BEADS COMPRISING HIGH MELT STRENGTH POLYPROPYLENE

CROSS REFERENCE TO RELATED APPLICATIONS

This application is a National Stage application of PCT/EP2022/054068, filed Feb. 18, 2022, which claims the benefit of European Application No. 21157928.9, filed Feb. 18, 2021, European Application No. 21157932.1, filed Feb. 18, 2021, European Application No. 21157935.4, filed Feb. 18, 2021, European Application No. 21157966.9, filed Feb. 18, 2021, and European Application No. 21157969.3, filed Feb. 18, 2021, all of which are incorporated by reference in their entirety herein.

FIELD

The present invention relates to a polymer composition comprising a high melt strength polypropylene, to expanded beads comprising said polymer composition, to a process for the preparation of said expanded beads, preferably by a foam extrusion process, to a molded article prepared from said beads and to processes for the preparation of said beads and molded articles.

BACKGROUND

Expanded polypropylene beads (EPP beads) are foamed particles. The shape of EPP beads is quasi-spherical. The diameter of polypropylene pellets prior to foaming, is typically in the range from 0.5 to 1.5 mm while the diameter of EPP beads is in the range of 1.0 to 5.5 mm. The degree of foaming can be described by the foaming ratio which is the volume ratio between the EPP beads and polypropylene pellets prior to foaming.

Currently, the vast majority of commercially available EPP beads are prepared via an autoclave process. Such autoclave process is for example described in the examples of EP2151470A1.

However, the main disadvantage of the autoclave process is that it is a batch process, which requires loading and unloading of the autoclave/reactor, which is time consuming and laborious. Therefore, there is a need for a process which enables continuous production of EPP beads and is less time consuming and laborious. Such a process is a bead foam extrusion process which uses an underwater granulator. WO99/32271A1 describes such a process and device for implementing the method. WO99/32271A1 discloses a method for producing a foamed granulate, wherein a thermoplastic synthetic material is placed in an extruder, the synthetic material is melted, a pressurized expanding agent is fed through one or several injection nozzles, the molten material enriched with the expanding medium is foamed as it exits through a perforated plate arranged at the outlet of the extruder and is granulated by a cutting device arranged behind the perforated plate.

EPP beads can be used to produce an article in a steam molding process. Steam molded articles made from EPP beads are known for use in various fields such as automotive, building and construction, furniture and toys due to their unique combination of properties e.g. good durability, light weight, excellent heat insulation, good chemical resistance, a good balance between tensile strength, impact resistance and compression strength and they also have excellent recycling properties.

However, the compositions currently used for the preparation of EPP beads using an autoclave process are not suitable for the preparation of EPP beads via a bead foam extrusion process, as the latter compositions cannot be foamed (enough) in a bead foam extrusion process.

The current EPP beads prepared via a bead foam extrusion process, for example the EPP beads as described in WO99/32271A1 and DE102011052273A1, are not very suitable for the production of articles in a steam molding process, as these beads have at least one of the following disadvantages in a steam molding process: they show excessive shrinkage of the molded article in the mold, they show collapse of the molded article, they have a narrow molding window, they require a high steam pressure for the preparation of the molded article.

Therefore, it is an object of the invention to provide a composition suitable for a process for the production of expanded polypropylene beads via a bead foam extrusion process, which EPP beads are suitable for conversion into an article via a steam molding process.

SUMMARY

This Object is Achieved by a Polymer Composition Comprising

- a) $\geq 10$ wt % and $\leq 60$ wt % of a high melt strength polypropylene,
- b) $\geq 10$ wt % and $\leq 35$ wt % of a polyethylene
- c) $\geq 10$ wt % and $\leq 60$ wt % of a first polypropylene, wherein the first polypropylene is chosen from the group of propylene homopolymers, propylene copolymers and/or mixtures thereof
- d) $\geq 0$ wt % and $\leq 60$ wt % of a second polypropylene wherein the sum of the high melt strength polypropylene, the first polypropylene and the second polypropylene is $\geq 60$ wt % based on the sum of the weight of the high melt strength polypropylene, the polyethylene, the first polypropylene and the second polypropylene and
- wherein the polyethylene has a density $\geq 940$ kg/m$^3$ and $\leq 970$ kg/m$^3$ as determined according to ISO 845 (2006).

DETAILED DESCRIPTION

It has been found that with the polymer composition of the invention, it is possible to produce expanded polypropylene beads via a bead foam extrusion process. The expanded polypropylene beads could then suitably be converted in a steam molding process.

WO2016/005301A1 discloses a mineral-filled polypropylene composition comprising

- (A) 15-70 wt % of a first heterophasic polypropylene (HECO-1) having an MFR$_2$ (ISO 1 133; 230° C.; 2.16 kg) in the range of 30-50 g/10 min, comprising
- (A-1) 65-90 wt % of a propylene homopolymer matrix (M-PP-1) with an MFR$_2$ (ISO 1 133; 230° C.; 2.16 kg) in the range of 150-400 g/10 min and a molecular weight distribution (MWD) in the range of 3.5-5.5 and
- (A-2) 10-35 wt % of a dispersed phase (D-1) being a copolymer of propylene and ethylene or C$_4$-C$_{10}$ alphaolefin with an intrinsic viscosity (measured in decaline according to DIN ISO 1628/1 at 135° C.) in the range of 2.0-4.0 dl/g, and an C$_2$-content of 20-65 wt % (measured with infrared spectroscopy)
- (B) 0-70 wt % of a second heterophasic polypropylene (HECO-2) having an MFR 2 (ISO 1 133; 230° C.; 2.16 kg) in the range of 5-25 g/10 min, comprising (B-1) 65-90 wt % of a propylene homopolymer matrix (M-PP-2) with an MFR 2 (ISO 1 133; 230° C.; 2.16 kg) in the range of 20-120 g/10 min and an MWD in the range of 3.5-5.5 and (B-2) 10-35 wt % of a dispersed phase (D2) being a copolymer of propylene and ethylene or C4-C$_{10}$ alpha-olefin with an intrinsic viscosity (measured in decaline according to DIN ISO 1628/1 at 135° C.) in the range of 2.0-4.0 dl/g, and an C$_2$-content of 20-65 wt % (measured with infrared spectroscopy)

(C) 10-30 wt % of a high melt strength polypropylene (HMS-PP) having (i) an MFR$_2$ (ISO 1 133; 230° C.; 2.16 kg) in the range of 1.0 to 5.0 g/10 min (ii) a F30 melt strength of at least 30 cN, determined in the Rheotens test at 200° C.; and (iii) a melt extensibility v30 of at least 200 mm/s, determined in the Rheotens test at 200° C. and (ix) xylene hot unsolubles (XHU) content of less than 1.25 wt %

(D) 5 to 20 wt % of an copolymer of ethylene and propylene or a C$_4$-C$_{10}$ alpha-olefin with a density of 0.860-0.910 g/cm 3 and an MFR 2 (ISO 1 133; 190° C.; 2.16 kg) in the range of 0.5-50 g/10 min (PE-COPO)

(E) 5-25 wt % of a high-density polyethylene (HDPE)

(F) 5-20 wt % of a mineral-filler and (G) 0-15 wt % of additives selected from antioxidants (AO), slip agents (SA), UV-stabilizers, anti-scratch additives, odour-scavengers and pigments, whereby the sum of the percentage amounts of the individual components of the composition is equal to 100 percent.

US2008/0058437A1 discloses an inherently open-celled polymeric foam consisting essentially of a polymer blend having cells with an average cell size of at least four millimeters defined therein wherein the foam has an inherently open-cell content of at least 40 percent (according to American Society for Testing and Materials (ASTM) D2856-94) and wherein the polymer blend consists essentially of:

(a) a high melt strength polypropylene;

(b) a second polypropylene selected from linear and substantially linear polypropylenes that have a melting point within ten degrees Celsius of (a), a melt flow rate (ASTM D-1238, condition L) that is significantly different than (a), and that are miscible with (a); and, optionally, (c) an ethylene polymer that is immiscible with (a); wherein the polymer blend contains 60 weight percent (wt %) or less of (c) based on polymer blend weight; and wherein (a) makes up at least 60 wt % and 90 wt % or less of the total weight of (a) and (b).

The molded products prepared from the expanded polypropylene beads showed sufficient fusion, no excessive shrinkage and/or no collapse.

Furthermore, it was found that the polymer compositions of the invention can be used to produce expanded polypropylene beads that can be molded into a molded article in a steam molding process with a broad molding window.

The steam molding process is an energy consuming process. It was also found that by using the (polymer compositions of the) invention, it is possible to lower the energy consumption by using lower steam pressures. This is advantageous from an energy/environmental as well as a commercial point of view.

Surprisingly, if was found that molded articles prepared from the polymer compositions of the invention could be molded from expanded polypropylene beads using lower steam pressures than the polymer compositions, known in the art while the molded articles had a similar or higher compression strengths.

In the context of the invention, with 'foamed' or 'foam' or 'expanded' is meant that the shape has a lower density due to the presence of gas bubbles (such as air) as compared to the density of the same material without gas bubbles.

Polymer Composition

Preferably, in the polymer composition of the invention, the sum of the amount of the high melt strength polypropylene, the polyethylene, the first polypropylene and the second polypropylene is ≥80 wt %, more preferably ≥85 wt %, more preferably ≥90 wt %, most preferably ≥95 wt % based on the polymer composition.

In the polymer composition, the sum of the high melt strength polypropylene, the first polypropylene and the second polypropylene is ≥60 wt %, for example ≥62 wt %, for example ≥64 wt %, for example ≥65 wt %, for example ≥66 wt %, preferably ≥67 wt %, for example ≥68 wt %, for example ≥69 wt %, for example ≥70 wt % based on the sum of the weight of the high melt strength polypropylene, the polyethylene, the first polypropylene and the second polypropylene.

Preferably, the polymer composition has a melt flow rate ≥0.5 and ≤8.0 g/10 min, more preferably ≥0.7 and ≤5.0 g/10 min, most preferably ≥1.0 and ≤4.0 g/10 min as determined in accordance with ASTM D1238 (2013) at a temperature of 230° C. under a load of 2.16 kg.

Polyethylene

In the polymer composition of the invention, the polyethylene has a density ≥940 kg/m 3 and ≤970 kg/m$^3$, preferably has a density ≥950 kg/m$^3$ and ≤970 kg/m$^3$, more preferably has a density ≥960 kg/m$^3$ and ≤970 kg/m$^3$ as determined according to ISO 845 (2006).

Such polyethylenes, also referred to herein as high density polyethylene or HDPE may be obtained either by a gas phase process, a slurry process or a solution process.

The production processes of HDPE are known and are for example summarized in "Handbook of Polyethylene" by Andrew Peacock (2000; Dekker; ISBN 0824795466) at pages 43-66. Suitable catalysts for the production of polyethylene include Ziegler Natta catalysts, chromium based catalysts and single site metallocene catalysts. The various processes may be divided into solution polymerisation processes employing homogeneous (soluble) catalysts and processes employing supported (heterogeneous) catalysts. The latter processes include both slurry and gas phase processes.

The ethylene polymer may be produced using ethylene as the sole monomer, or may be produced using ethylene and one or more α-olefin comonomers. In case the ethylene polymer is produced using ethylene as the sole monomer, the ethylene polymer is an ethylene homopolymer. In case the ethylene polymer is produced using ethylene and one or more α-olefin comonomers, such as propylene, 1-butene, 1-hexene and 1-octene, preferably 1-butene and/or 1-hexene, the ethylene polymer is an ethylene copolymer.

The polyethylene is present in the polymer composition in an amount 10 wt % and 35 wt %, preferably in an amount 15 wt % and 35 wt %, for example in an amount 17 wt % and 33 wt %, most preferably in an amount 20 wt % and 30 wt % based on the polymer composition.

Preferably, the polyethylene has a melt flow rate 0.10 and 8.0 g/10 min, preferably has a melt flow rate 0.5 and 6.0 g/10 min, more preferably has a melt flow rate 1.0 and 4.0 g/10 min as determined in accordance with ASTM D1238 (2013) at a temperature of 190° C. under a load of 2.16 kg.

High Melt Strength Polypropylene

High melt strength polypropylenes are available in the art. Typically such polypropylenes are branched polypropylene. A branched polypropylene differs from a linear polypropylene in that the polypropylene backbone has side chains, whereas a non-branched (linear) polypropylene does not have side chains on its backbone. There are different ways to achieve branching in polypropylenes. For example, branching can be achieved by using a specific catalyst, for example a specific single-site catalyst, or by chemical modification. EP 1892264 described the preparation of a branched polypropylene obtained by the use of a specific catalyst. EP0879830 describes the preparation of a branched polypropylene by chemical modification.

WO2009/003930A1 discloses an irradiated polymer composition comprising at least one polyolefin resin and at least one non-phenolic stabilizer, wherein the irradiated polymer composition is produced by a process comprising mixing the polyolefin resin with the non-phenolic stabilizer and irradiating this mixture in a reduced oxygen environment. By using the process of WO2009/003930, branched polypropylenes can also be obtained.

Examples of commercially available high melt strength polypropylene include but are not limited to Daploy™ polypropylenes available from Borealis and Bourouge, e.g. Daploy™ WB 135HMS, Daploy™ 135HMS or Daploy™ WB260HMS.

In addition, a high melt strength polypropylene is available from SABIC as SABIC® PP UMS 561 P as of 18 Feb. 2021.

Preferably, the High Melt Strength Polypropylene is Prepared by a) irradiation of a polypropylene with at least one non-phenolic stabilizer, preferably wherein the non-phenolic stabilizer is chosen from the group of hindered amines, wherein the irradiation is performed with 2.0 and 20 Megarad electron beam radiation in a reduced oxygen environment, wherein the amount of active oxygen is ≤15% by volume with respect to the total volume of the reduced oxygen environment for a time sufficient for obtaining a long chain branched polypropylene and b) deactivation of the free radicals in the long chain branched polypropylene to form the high melt strength polypropylene.

How to deactivate the free radicals is known in the art, for example by heating as described in WO2009003930A1.

Examples of non-phenolic stabilizers are known in the art and are for example disclosed on pages 37-60 of WO2009/003930A1, hereby incorporated by reference. Preferably, the non-phenolic stabilizer is chosen from the group of hindered amines.

More preferably, the non-phenolic stabilizer comprises at least one hindered amine selected from the group of Chimassorb® 944, Tinuvin® 622, Chimassorb® 2020, Chimassorb® 119, Tinuvin® 770, and mixtures thereof, separate or in combination with at least one hydroxylamine, nitrone, amine oxide, or benzofuranone selected from N,N-di(hydrogenated tallow)amine (Irgastab® FS-042), an N,N-di(alkyl)hydroxylamine produced by a direct oxidation of N,N-di(hydrogenated tallow)amine (Irgastab® FS-042), N-octadecyl-α-heptadecylnitrone, Genox™ EP, a di(C16-C18)alkyl methyl amine oxide, 3-(3,4-dimethylphenyl)-5,7-di-tert-butyl-benzofuran-2-one, Irganox® HP-136 (BFI), and mixtures thereof, and separate or in combination with at least one organic phosphite or phosphonite selected from tris(2,4-di-tert-butylphenyl) phosphite (Irgafos® 168). Even more preferably, the non-phenolic stabilizers of the present subject matter can include those described in U.S. Pat. Nos. 6,664,317 and 6,872,764, both of which are incorporated herein by reference in their entirety.

Preferably, the high melt strength polypropylene has a melt strength ≥10 cN and ≤100 cN, wherein the melt strength is determined in accordance with ISO 16790:2005 at a temperature of 200° C., using a cylindrical capillary having a length of 20 mm and a width of 2 mm, a starting velocity $v_0$ of 9.8 mm/s and an acceleration of 6 mm/s$^2$.

Preferably, the high melt strength polypropylene has a melt strength ≥10 cN, preferably ≥20 cN, more preferably ≥30 cN, more preferably ≥40 cN, more preferably ≥45 cN. Even more preferably, the melt strength of the high melt strength polypropylene is ≥50 cN, more preferably ≥55 cN, even more preferably ≥60 cN, most preferably ≥65 cN and/or preferably the melt strength of the high melt strength polypropylene composition is ≥95 cN, for example ≤90 cN, for example ≤87 cN.

The melt strength of the high melt strength polypropylene is determined in accordance with ISO 16790:2005 at a temperature of 200° C., using a cylindrical capillary having a length of 20 mm and a width of 2 mm, a starting velocity v0 of 9.8 mm/s and an acceleration of 6 mm/s2.

The high melt strength polypropylene is present in the polymer composition in an amount of ≥10 wt % and ≤60 wt % based on the polymer composition. For example, the amount of high melt strength polypropylene is ≥14 wt %, for example ≥20 wt %, preferably ≥27 wt % and/or ≤55 wt %, for example ≤50 wt %, for example ≤45 wt %, preferably ≤40 wt %. Preferably, the high melt strength polypropylene is present in the polymer composition in an amount of ≥14 wt % and ≤45 wt % based on the polymer composition, more preferably in an amount of ≥27 wt % and ≤40 wt % based on the polymer composition.

The high melt strength polypropylene is preferably present in the polymer composition in an amount ≥27 wt % based on the polymer composition.

With polypropylene as used herein is meant propylene homopolymer, a copolymer of propylene with an α-olefin or a heterophasic propylene copolymer.

Preferably, the high melt strength polypropylene is a polypropylene chosen from the group of propylene homopolymers and propylene copolymers comprising moieties derived from propylene and one or more comonomers chosen from the group of ethylene and alpha-olefins with ≥4 and ≤12 carbon atoms.

Preferably, the propylene copolymer comprises moieties derived from one or more comonomers chosen from the group of ethylene and alpha-olefins with ≥4 and ≤12 carbon atoms in an amount of ≤10 wt %, for example in an amount of ≥1.0 and ≤7.0 wt % based on the propylene copolymer, wherein the wt % is determined using $^{13}$C NMR. For example, the propylene copolymer comprises moieties derived from one or more comonomer chosen from the group of ethylene, 1-butene, 1-pentene, 1-hexene, 4-methyl-1-pentene, 1-heptene, 1-octene, 1-decene and 1-dodecene, preferably moieties derived from ethylene.

Polypropylenes and the processes for the synthesis of polypropylenes are known. A propylene homopolymer is obtained by polymerizing propylene under suitable polymerization conditions. A propylene copolymer is obtained by copolymerizing propylene and one or more other comonomers, for example ethylene, under suitable polymerization conditions. The preparation of propylene homopolymers and copolymers is for example described in Moore, E. P. (1996)

Polypropylene Handbook Polymerization, Characterization, Properties, Processing, Applications, Hanser Publishers: New York.

Propylene homopolymers, propylene copolymers and heterophasic propylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

In the polymer composition of the invention, the largest difference between the highest melting temperature (Tm) of the high melt strength polypropylene (Tmelt HMS) and the highest melting temperature of a polypropylene (Tmelt PP) is ≥13 and ≤32° C., preferably ≥15 and ≤30° C., more preferably ≥17 and ≤22° C., wherein the melting temperatures are determined using a differential scanning calorimeter on the second heating cycle using a heating rate of 10° C./min and a cooling rate of 10° C./min. This has the advantage that the steam pressure needed in a steam-molding process to prepare articles produced from expanded beads comprising the polymer composition of the invention can be reduced.

In case—apart from the high melt strength polypropylene, there are two or more further polypropylenes present in the composition of the invention, the largest difference in melting temperatures should be taken.

For example, in case two polypropylenes are present in the polymer composition of the invention, wherein one polypropylene has a Tm of 143° C. and the other polypropylene has a Tm of 162° C. and the high melt strength polypropylene has a Tm of 162° C., the difference Tmelt UMS and T melt PP1 is 162° C.–143° C.=19° C. (and not 165° C.–162° C.=3° C.).

Preferably, the high melt strength polypropylene has a VOC value as determined in accordance with VDA278 (2011-10)≤250 µg/g, preferably a VOC value ≤50 µg/g and/or an FOG value as determined in accordance with VDA278 (2011-10)≤500 µg/g, preferably an FOG-value ≤100 µg/g.

Preferably, the high melt strength polypropylene has a melt flow rate ≥0.5 and ≤8.0 g/10 min, more preferably ≥0.7 and ≤5.0 g/10 min, most preferably ≥1.0 and ≤4.0 g/10 min as determined in accordance with ASTM D1238 (2013) at a temperature of 230° C. under a load of 2.16 kg.

The polymer composition may further comprise additives, such as for example flame retardants, pigments, lubricants, slip agents flow promoters, antistatic agents, processing stabilizers, long term stabilisers and/or UV stabilizers. The additives may be present in any desired amount to be determined by the man skilled in the art, but are preferably present ≥0.001 wt % and ≤5.0 wt %, more preferably ≥0.01 wt % and ≤4.0 wt %, even more preferably ≥0.01 wt % and ≤3.0 wt %, even more preferably ≥0.01 wt % and ≤2.0 wt % based on the polymer composition.

Preferably, the first polypropylene is chosen from the group of propylene homopolymers and propylene copolymers and the second polypropylene is chosen from the group of propylene homopolymers, propylene copolymers and heterophasic propylene copolymers, preferably wherein the second polypropylene is a propylene homopolymer.

For example, the first polypropylene may have a melt flow rate ≥0.2 and ≤8.0 g/10 min as determined in accordance with ASTM D1238 (2013) at a temperature of 230° C. under a load of 2.16 kg.

For example, the second polypropylene may have a melt flow rate ≥0.2 and ≤8.0 g/10 min as determined in accordance with ASTM D1238 (2013) at a temperature of 230° C. under a load of 2.16 kg.

Preferably, the sum of the amount of the first and the second polypropylene is ≥30 and ≤60 wt % based on the polymer composition.

The polymer composition may further comprise a nucleating agent. A nucleating agent may be desired to increase the cell density and to modify the dynamics of bubble formation and growth. (Gendron, Thermoplastic foam Processing, 2005, page 209).

The amount of nucleating agent may for example be ≥0.010 wt % and ≤5.0 wt %, for example ≥0.030 wt % and ≤4.0 wt %, for example ≥0.050 wt % and ≤3.0 wt %, preferably ≥0.10 wt % and ≤2.5 wt %, more preferably ≥0.30 wt % and ≤1.5 wt % based on the polymer composition, most preferably ≥0.50 wt % and ≤1.2 wt % based on the polymer composition.

Suitable nucleating agents include but are not limited to talc, silica and a mixture of sodium bicarbonate and citric acid. Other suitable nucleating agents include amides, for example azo dicarbonamide, amines and/or esters of a saturated or unsaturated aliphatic ($C_{10}$-$C_{34}$) carboxylic acid.

Examples of suitable amides include fatty acid (bis) amides such as for example stearamide, caproamide, caprylamide, undecylamide, lauramide, myristamide, palmitamide, behenamide and arachidamide, hydroxystearamides and alkylenediyl-bis-alkanamides, preferably ($C_2$-$C_{32}$) alkylenediyl-bis-($C_2$-$C_{32}$) alkanamides, such as for example ethylene bisstearamide (EBS), butylene bisstearamide, hexamethylene bisstearamide, ethylene bisbehenamide and mixtures thereof. Suitable amines include or instance ($C_2$-$C_{18}$) alkylene diamines such as for example ethylene biscaproamine and hexamethylene biscaproamine. Preferred esters of a saturated or unsaturated aliphatic ($C_{10}$-$C_{34}$) carboxylic acid are the esters of an aliphatic ($C_{16}$-$C_{24}$) carboxylic acid.

Preferably, the nucleating agent is chosen from the group of talc, sodium bicarbonate, citric acid, azodicarbonamide and mixtures thereof, more preferably the nucleating agent is talc.

For the preparation of the expanded polypropylene beads, it may be desired to use a cell stabilizer. Therefore, the invention also relates to a polymer composition of the invention further comprising a cell stabilizer. Cell stabilizers are permeability modifiers which retard the diffusion of for example hydrocarbons such as isobutane to create dimensionally stable foams. (Gendron, Thermoplastic foam Processing, 2005, pages 31 and 149) Preferred cell stabilizers include but are not limited to glycerol monostearate (GMS), glycerol monopalmitate (GMP), palmitides and/or amides. Suitable amides are for example stearyl stearamide, palmitide and/or stearamide. Suitable mixtures include for example a mixture comprising GMS and GMP or a mixture comprising stearamide and palmitamide. Preferably, in case a cell stabilizer is used, the cell stabilizer is glycerol monostearate or stearamide.

The amount of cell stabiliser to be added depends on desired cell size and the polymer composition used for the preparation of the expanded polypropylene beads. Generally, the cell stabiliser may be added in an amount ≥0.10 and ≤3.0 wt %.

The polymer composition of the invention can suitably be used for the preparation of expanded polymer beads. Therefore, in another aspect, the invention relates to expanded polypropylene beads comprising the polymer composition of the invention.

Preferably, the polymer composition of the invention is present in an amount ≥95 wt %, for example ≥96 wt %, for example ≥97 wt %, preferably ≥98 wt %, for example ≥99 wt %, based on the expanded polypropylene beads. Most preferably, the expanded polypropylene beads consist of the polymer composition of the invention.

In Another Aspect, the Invention Relates to a Process Comprising the Sequential Steps of:

a) providing the polymer composition of the invention b) adding a blowing agent to the polymer composition, for example wherein the blowing agent is added in an amount 0.10 wt % and 20 wt % based on the polymer composition and c) subjecting the mixture of the polymer composition and the blowing agent to a foam extrusion process to form a foamed extruded product and d) cutting the foamed extruded product to form expanded polypropylene beads and e) optionally molding the expanded polypropylene beads obtained in step d) to form a molded article, for example wherein the molding is steam molding.

Processes for the preparation of expanded polypropylene beads are known in the art and include autoclave and extrusion processes. Preferably, the expanded polypropylene beads of the invention are obtained by a foam extrusion process, which process is known per se.

For example, WO99/32271A1 describes such a process and device for implementing the method. WO99/32271A1 discloses a method for producing a foamed granulate, wherein a thermoplastic synthetic material is placed in an extruder, the synthetic material is melted, a pressurized expanding agent is fed through one or several injection nozzles, the molten material enriched with the expanding medium is foamed as it exits through a perforated plate arranged at the outlet of the extruder and is granulated by a cutting device arranged behind the perforated plate.

Preferably, the density of the expanded polypropylene beads is ≥20 and ≤350 kg/m³, preferably ≥20 and ≤200 kg/m³, for example ≥20 and ≤100 kg/m³, for example ≥20 and ≤50 kg/m³.

Preferably, the expanded polypropylene beads have an open cell content of ≤20%, preferably ≤17%, more preferably ≤15%, for example ≤12%, for example ≤10% wherein the open cell content is determined according to ASTM D6226-10.

The expanded polypropylene beads can be molded into an article using a molding process known per se, for example by a steam molding process. Therefore, in another aspect, the invention also relates to a molded article comprising the expanded polypropylene beads of the invention.

In another aspect, the invention relates to the use of the polymer composition of the invention in a foam extrusion process. In another aspect the invention relates to the use of the polymer composition of the invention for the preparation of expanded polypropylene beads. In yet another aspect, the invention relates to the use of the expanded polypropylene beads of the invention to prepare molded articles, for example for molded articles for use in the field of automotive, building and construction, furniture or toys.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Methods

Melt Flow Rate (MFR)

The melt flow rate of the polymers was determined in accordance with ASTM D1238 (2013) at a temperature of 190° C. ($MFR_{190}$) or 230° C. ($MFR_{230}$) under a load of 2.16 kg.

Density

The density of the polymers was determined in accordance with ASTM D792 (2008).

Amount of Comonomer

The amount of comonomer in the polymer was determined using $^{13}C$ NMR.

Melting Temperature (Tm)

The melting temperature of the polymers was measured using a differential scanning calorimeter (DSC, TA Instruments Q20) on the second heating cycle using a heating rate of 10° C./min and a cooling rate of 10° C./min and a temperature range of −40 to 200° C.

In case a the polymers has multiple melting temperatures, the highest melting temperature is reported as the melting temperature (Tm).

Difference Tmelt UMS and T melt PP1 is the largest difference between the Tm of the high melt strength polypropylene and the Tm of the other polypropylenes present in the polymer composition. For example, in case two polypropylenes are present, wherein one polypropylene has a Tm of 143° C. and the other polypropylene has a Tm of 165° C. and the high melt strength polypropylene has a Tm of 162° C., the difference Tmelt UMS and T melt PP is 165-143=19° C.

Melt Strength

Melt strength was measured according to ISO standard 16790:2005. Melt strength is defined as the maximum (draw-down) force (in cN) by which a molten thread can be drawn before it breaks, e.g. during a Rheotens measurement. Measurements were done on a Göttfert Rheograph 6000 at a temperature of 200° C. with a setup like shown in FIG. 1 of ISO standard 16790:2005. The rheometer has an oven with a diameter of 12 mm. A capillary of 20 mm length and 2 mm width was used. The entrance angle of the capillary was 180° (flat). The piston in the rheometer moved with a velocity of 0.272 mm/s to obtain an exit velocity v0, of 9.8 mm/s. After filling the rheometer, the melt was held in the rheometer for 5 minutes, to stabilize the temperature and fully melt the polymer. The strand that exits the capillary was drawn with a Rheotens II from Goettfert with an acceleration of 6 mm/s$^2$ until breakage occurred. The distance between the exit of the capillary and the uptake wheels of the Rheotens II (=draw length) was 100 mm.

The pressure required to push the melted polymer through the capillary, the maximum drawing force (=Melt strength) and the maximum draw ratio at breakage were recorded.

Bulk Density

The bulk density was determined by using a measuring beaker with an effective volume of 1 liter. The beaker was filled with expanded polypropylene beads to the top and the weight was measured, resulting value is the bulk density in g/I.

Foam Density and Density of the Molded Article

Density of the molded article (kg/m$^3$) is the apparent overall density and was determined according to ISO 845: 2006.

To this end, first the weight (m) of a handful expanded polypropylene beads was determined with a scale in air. Secondly, the handful of the expanded polypropylene beads were placed into a perforated metal cage. The volume (V) of the expanded polypropylene beads was determined under water by measuring buoyancy force using a scale. The (buoyancy) V is directly related with the geometric volume of the sample. The foam density can be calculated using following equation: ρ=m/v Open Cell Content The open cell content was determined by using a Quantachrome Pentapyc 5200e gas pycnometer using a method based on ASTM D6226-10. The volume from the external dimensions of the sample was determined by using the Archimedes' principle as described for the determination of the volume of the expanded polypropylene beads above. It was assumed that the uptake of water by the sample can be neglected. After drying the sample from adhering water, the sample volume ($V_{SPEC}$) was determined by the pycnometer according ASTM D6226-10 at different pressures.

All applied pressures were below 0.1 bar to minimize compression of the foam.

$$V_{SPEC} = V_{CHAMBER} - V_{EXP} / \left[ \frac{P_1}{P_2} - 1 \right]$$

wherein:

$V_{SPEC}$ = Volume Sample $V_{CHAMBER}$ = Volume sample chamber $V_{EXP}$ = Expansion volume The sample volume of the foam was plotted against the applied pressures (0.090 bar; 0.075 bar, 0.060 bar, 0.045 bar, 0.035 bar, 0.020 bar and 0.010 bar). A straight line was fit through the measurement points, using linear regression. The interception of the linear regression line with the Y-axis at p=0 bar is the volume ($V_{SPEC\_0}$) used in equation below.

The open cell content $V_{open}$ (%) was calculated using the following formula:

$$O_V = [(V - V_{SPEC\_0}) / V] * 100$$

wherein:

$O_V$ = open cell content [%]

$V$ = Geometric volume $V_{SPEC\_0}$ = Volume sample interpolated to a pressure of 0 bar Evaluation of Extrusion Foaming The evaluation of extrusion foaming was determined based on the processing observations. During cooling of the melt the viscosity increases resulting into a pressure build-up at the die. When die pressures reached pressure >180 bar, the processing was considered poor and a '−' was noted for 'extrusion processing'. If die pressures were ≤180 bar, the extrusion processing was noted as '+'.

Rate of Fusion

With the use of a sharp razorblade a cut of approximately 5 mm in depth was made over the width of the obtained molded article. The product was broken along the pre-cut and the resulted surface area was evaluated. The ratio of the number of beads that were broken through the beads to the total number of all beads observed at the surface area was calculated (=rate of fusion). Whenever the rate of fusion was more than 50% the fusion was regarded as acceptable.

The minimal steam pressure needed for reaching a rate of fusion >50% was noted in Table as Steam pressures [bar] (>50% fusion).

Compression Strength

The compression strength was determined with the use of a ZwickRoell tensile testing machine using ISO844:2014. The skin layer of the molded article was removed and samples of 50×50×50 mm were taken. 1N pre-load was applied before measurement. During the measurement, the applied compression speed was 5 mm/min was until a compression of 80% was reached. The compression stress at 10%, 25% and 50% compression was recorded and the value obtained was reported as compression strength.

Materials

The properties of the polypropylenes used as listed below in Table 1. The properties of the polyethylenes are listed below in Table 2. All polypropylenes and polyethylenes are commercially available from SABIC. SABIC® PPUMS 561P is commercially available as of 18 Feb. 2021 without confidentiality restrictions.

TABLE 1

Properties of the SABIC polypropylenes used.

| | PP-UMS | hPPA | hPPB | rPPA | rPPB |
|---|---|---|---|---|---|
| SABIC commercial name | PP UMS 561P | 525P | 531P | RA1E10 | 620P |
| Type of polypropylene | propylene homopolymer | propylene homopolymer | propylene homopolymer | random propylene-ethylene copolymer | random propylene-ethylene copolymer |
| $MFR_{230}$ (g/10 min) | 2.5 | 3.0 | 0.30 | 0.30 | 1.7 |
| Density (kg/m³) | 905 | 905 | 905 | 905 | 905 |
| [$C_2$] (wt %) | 0 | 0 | 0 | 3.5 | 3.5 |
| Tm (° C.) | 162 | 165 | 165 | 143 | 143 |
| melt strength (cN) | 71 | | | | |

TABLE 2

Properties of the SABIC polyethylenes used.

| | | HDPE | LDPE |
|---|---|---|---|
| SABIC commercial name | | CC027C | 2202u0 |
| type | | high density polyethylene | low density polyethylene |
| $MFR_{190}$ | g/10 min | 0.70 | 1.9 |
| density | kg/m³ | 953 | 922 |
| [$C_2$] | wt % | N/A | N/A |

Talc: stands for POLYBATCH® FPE 50 T, which is a 50% masterbatch of talcum in polyethylene and which is commercially available from LyondellBasell.

GMS stands for Atmer™ 7300 50% MB, which is a 50% concentrate in polyethylene containing an anti-static agent (glycerol monostearate) and which is commercially available from Croda.

PBA: stands for physical blowing agent. In the below foaming experiments, iso-butane was used as physical blowing agent.

TABLE 3

Polymer compositions used for the preparation of the expanded polypropylene beads by extrusion

| | | E1 | E2 | E3 | E4 | CE1 | CE2 | CE3 | CE4 |
|---|---|---|---|---|---|---|---|---|---|
| PP-UMS | wt % | 25 | 32 | 32 | 15 | 68 | 32 | | |
| rPP-B | wt % | 46 | 39 | | 39 | | 48 | 48 | |
| rPP-A | wt % | | | | 17 | | | | |
| hPP-A | wt % | | | 39 | | | 16 | 48 | |
| hPP-B | wt % | | | | | | | | 68 |
| HDPE | wt % | 25 | 25 | 25 | 25 | | | | |
| LDPE | wt % | | | | | 28 | | | 28 |
| Talc | wt % | 2 | 2 | 2 | 2 | 2 | 2 | 2 | 2 |
| GMS | wt % | 2 | 2 | 2 | 2 | 2 | 2 | 2 | 2 |
| Difference Tmelt UMS and T melt PP | ° C. | 19 | 19 | 3 | 19 | NA | 19 | NA | NA |

NA: not applicable

Preparation of the Expanded Polypropylene Beads by a Foam Extrusion Process

For examples E1-E4 and comparative examples CE1-CE4, the polymers and ingredients were dosed in amounts as indicated in Table 3, in a co-rotating twin-screw extruder. The extruder was a 30 mm double screw foam extruder from Theysohn having a length over diameter ratio (l/d) of 40. This extruder consists of nine electrical heating zones equipped with water cooling followed by a cooling section a static mixer and an underwater pelletizing system. The polymer, talc and GMS were dosed at the start of the extruder. The PBA was dosed in an amount of 12 wt % based on the polymer composition in zone 8. The molten mixture as obtained was then cooled using a melt cooler set at 145° C. After cooling, the melt was extruded through a perforated die plate with 20 holes having a diameter of 0.65 mm and a land length of 3 mm at a throughput of 10 kg/hour. The die plate was controlled at a temperature of 185° C., except for CE4 where the die plate was controlled at a temperature of 205° C. The melt was cut by a 6-blade angled cutter head rotating at 1700 RPM with the use of an underwater pelletizing system. The temperature of the water was controlled at 50° C. The pressure was controlled at 1 bar. And the flow of the water was controlled at 10 m³/h, thereby obtaining the expanded polypropylene beads.

Steam-Molding the Expanded Polypropylene Beads into a Molded Article

The expanded polypropylene beads obtained in examples E1-E4 and comparative examples CE1-CE4 were stored in the pressure vessel connected to the steam chest molding machine at an air pressure of 1.7 bar. The block-shape mold (300×200×60 mm; I×b×h) was filled with the expanded polypropylene beads. In the mold cavity, an air pressure of 1.2 bar was applied during filling. Subsequently the air in the mold was replaced by steam and a steam pressure was applied for 10 seconds. The lowest steam pressure applied was 3.0 bars and the steam pressure was then increased step-wise with steps of 0.1 bar and after each step increase, the mold was held at the steam pressure for 10 seconds. The resultant molded article was put in an oven at 70° C. for 24 hours to allow drying. The molded article was then stored at 23° C. for 24 hours before evaluation of the properties of the molded article.

The results of experiments E1-E4 and CE1-CE4 are presented below. CE1 presented excessive shrinkage in the mold. CE2 presented a narrow molding window; and CE3 presented collapse above >4.6 bar steam pressure. CE4 presented a narrow window.

Excessive shrinkage: the volume of the molded article is more than 5% smaller than the volume of the mold cavity.

A sample shows collapse if the molded article did not retain the shape of the mold and/or shows sinkholes.

A sample has a narrow molding window if the range of the steam pressure in which a good molded article is obtained (>50% rate of fusion, no excessive shrinkage and no collapse) is <0.5 bar.

TABLE 4

| Results of experiments E1-E4 and CE1-CE4 | | | | | | | | | |
|---|---|---|---|---|---|---|---|---|---|
| Difference Tmelt 1 and T melt 2 | | E1 | E2 | E3 | E4 | CE1 | CE2 | CE3 | CE4 |
| bulk density | g/l | 22 | 25 | 26 | 23 | 25 | 25 | 28 | 25 |
| bead foam density | kg/m³ | 39 | 44 | 43 | 40 | 43 | 42 | 49 | 45 |
| Open cell content | % | 15 | 13 | 9 | 16 | 11 | 15 | 31 | 13 |
| Extrusion processing | | + | + | + | + | + | + | + | − |
| Molded article density | kg/m³ | 49.7 | 50.2 | 49.9 | 49.0 | NA | 50.2 | NA | 50.9 |
| Steam pressures (>50% rate of fusion) | bar | 3.6 | 3.7 | 4.9 | 3.6 | NA | 5.0[1] | NA | 5.0[1] |
| Compression Strength F10% | kPa | 94.3 | 113.6 | 136.0 | 102.5 | NA | 99.5 | NA | 102.9 |
| Compression Strength F25%; | kPa | 129.9 | 143.7 | 186.6 | 136.4 | NA | 129.4 | NA | 131.3 |
| Compression Strength F50% | kPa | 203.9 | 213.3 | 276.3 | 204.7 | NA | 187.4 | NA | 189.9 |

[1]steam pressure measured at a rate of fusion < 25%.
NA: not applicable

SUMMARY OF THE RESULTS

As can be seen from the above results in Table 4, the polymer compositions of the invention (E1-E4) allow for the preparation of expanded beads by extrusion. The expanded beads show an acceptable amount of open cells (<20%) and the extrusion processing went well.

The expanded beads of the invention (E1-E4) could be steam-molded into molded articles showing a rate of fusion >50% at lower steam pressures than those of the comparative examples (CE1-CE4). In addition, the molded articles prepared from the expanded beads of the invention showed a good compression strength.

When using an amount of 27 wt % of high melt strength polypropylene (PP-UMS) in the polymer composition of the invention, the amount of open cells in the expanded beads prepared therefrom is decreased (compare E2 and E3 having an amount of 32 wt % PP-UMS in the polymer composition to E1 and E4).

By the use of a propylene homopolymer in the polymer composition (E3), the compression strength of the molded article can be increased.

As can be seen from the above results in Table 4, the steam pressure needed to mold articles to a rate of fusion >50% is less for a polymer composition according to the invention, wherein the difference between a melting temperature of the high melt strength polypropylene HMS-PP (Tmelt HMS) and a melting temperature of the first polypropylene PP-1 (Tmelt PP1), is ≥13 and ≤32° C., preferably ≥15 and ≤30° C., more preferably ≥17 and ≤22° C., wherein the melting temperatures of the high melt strength polypropylene HMS-PP and of the first polypropylene PP-1 are determined using a differential scanning calorimeter on the second heating cycle using a heating rate of 10° C./min and a cooling rate of 10° C./min: compare examples E1, E2 and E4 as compared to example E3.

The invention claimed is:

1. Expanded polypropylene beads comprising a polymer composition, wherein the polymer composition comprises:
   a) ≥10 wt % and ≤60 wt % of a high melt strength polypropylene,
   b) ≥10 wt % and ≤35 wt % of a polyethylene,
   c) ≥10 wt % and ≤60 wt % of a first polypropylene, wherein the first polypropylene is chosen from the group of propylene homopolymers, propylene copolymers and/or mixtures thereof,
   d) ≥0 wt % and ≤60 wt % of a second polypropylene, wherein the sum of the high melt strength polypropylene, the first polypropylene and the second polypropylene is ≥60 wt % based on the sum of the weight of the high melt strength polypropylene, the polyethylene, the first polypropylene and the second polypropylene and wherein the polyethylene has a density ≥940 kg/m³ and ≤970 kg/m³ as determined according to ISO 845 (2006).

2. Expanded polypropylene beads according to claim 1, wherein the sum of the amount of the high melt strength polypropylene, the polyethylene, the first polypropylene and the second polypropylene is ≥80 wt % based on the polymer composition.

3. Expanded polypropylene beads according to claim 1, wherein the polyethylene has a density ≥950 kg/m³ and ≤970 kg/m³, as determined according to ISO 845 (2006).

4. Expanded polypropylene beads according to claim 1, wherein the largest difference between the highest melting temperature of the high melt strength polypropylene (Tmelt HMS) and the highest melting temperature of a polypropylene (Tmelt PP) is ≥13 and ≤32° C., wherein the melting temperatures are determined using a differential scanning calorimeter on the second heating cycle using a heating rate of 10° C./min and a cooling rate of 10° C./min.

5. Expanded polypropylene beads according to claim 1, wherein the high melt strength polypropylene has a melt strength ≥10 cN and ≤100 cN, wherein the melt strength is determined in accordance with ISO 16790:2005 at a temperature of 200° C., using a cylindrical capillary having a length of 20 mm and a width of 2 mm, a starting velocity $v_0$ of 9.8 mm/s and an acceleration of 6 mm/s².

6. Expanded polypropylene beads according to claim 1, wherein the high melt strength polypropylene has a melt flow rate ≥0.50 and ≤8.0 g/10 min, as determined in accordance with ASTM D1238 (2013) at a temperature of 230° C. under a load of 2.16 kg and/or wherein the high melt strength polypropylene is a polypropylene chosen from the group of propylene homopolymers and propylene copolymers comprising moieties derived from propylene and one or more comonomers chosen from the group of ethylene and alpha-olefins with ≥4 and ≤12 carbon atoms.

7. Expanded polypropylene beads according to claim 1, wherein the high melt strength polypropylene is present in the polymer composition in an amount ≥27 wt % and ≤60 wt % based on the polymer composition.

8. Expanded polypropylene beads according to claim 1, wherein the polyethylene has a melt flow rate ≥0.10 and ≤8.0 g/10 min, as determined in accordance with ASTM D1238 (2013) at a temperature of 190° C. under a load of 2.16 kg.

9. Expanded polypropylene beads according to claim 1, wherein the first polypropylene is chosen from the group of propylene homopolymers and propylene copolymers and/or wherein the second polypropylene is chosen from the group of propylene homopolymers, propylene copolymers and heterophasic propylene copolymers.

10. Expanded polypropylene beads according to claim 1, further comprising a nucleating agent.

11. Expanded polypropylene beads according to claim 1, wherein the polymer composition further comprises ≥0.001 wt % and ≤5.0 wt % additives based on the polymer composition.

12. Expanded polypropylene beads comprising the polymer composition in an amount ≥95 wt % based on the expanded polypropylene beads.

13. Expanded polypropylene beads according to claim 12, wherein the density of the expanded polypropylene beads is ≥20 and ≤350 kg/m³ and/or wherein the expanded polypropylene beads have an open cell content of ≤20.0%, wherein the open cell content is determined according to ASTM D6226-10.

14. Molded article comprising the expanded polypropylene beads of claim 1.

15. Process comprising the sequential steps of:

a) providing a polymer composition comprising: ≥10 wt % and ≤60 wt % of a high melt strength polypropylene; ≥10 wt % and ≤35 wt % of a polyethylene; ≥10 wt % and ≤60 wt % of a first polypropylene, wherein the first polypropylene is chosen from the group of polypropylene homopolymers, propylene copolymers and/or mixtures thereof;

and ≥0 wt % and ≤60 wt % of a second polypropylene, wherein the sum of the high melt strength polypropylene, the first polypropylene, and the second polypropylene is ≥60 wt % based on the sum of the weight of the high melt strength polypropylene, the polyethylene, the first polypropylene, and the second polypropylene, and wherein the polyethylene has a density ≥940 kg/m³ and ≤970 kg/m³ as determined according to ISO 845 (2006), b) adding a blowing agent to the polymer composition, c) subjecting a mixture of the polymer composition and the blowing agent to a foam extrusion process to form a foamed extruded product, d) cutting the foamed extruded product to form expanded polypropylene beads, and e) optionally molding the expanded polypropylene beads obtained in step d) to form a molded article.

* * * * *